Oct. 25, 1960

P. MILLER 2,957,402

SYSTEM FOR VENTILATING CONFINED SPACES

Filed Jan. 10, 1956

INVENTOR
Phillip Miller
BY Ernest A. Joensen
ATTORNEY

United States Patent Office 2,957,402
Patented Oct. 25, 1960

2,957,402
SYSTEM FOR VENTILATING CONFINED SPACES

Philip Miller, East Norwich, N.Y., assignor to Associated Nucleonics, Inc., a corporation of New York Filed Jan. 10, 1956, Ser. No. 558,287

1 Claim. (Cl. 98—38)

The present invention relates to ventilation, and, more particularly, to a system for ventilating a confined space such as a shelter against blast or radioactive fallout.

In such a shelter ventilation is required for several purposes. One function of ventilation is to replace the oxygen used up by human breathing. Another function of ventilation is to increase comfort by removing carbon dixoide and moisture introduced by breathing and by eliminating odors. Auxiliary functions of ventilation may be to remove or supply heat to the shelter.

Normal ventilation practice calls for ten cubic feet of fresh air per minute per person, while Civilian Defense minimum requirements are one cubic foot per minute. Thus, for a shelter housing five persons, a fan or blower is required which is capable of delivering five cubic feet of fresh air per minute. Since such fans or blowers are generally powered by an electric motor, a source of electricity such as a storage battery or a gasoline motor powered generator must be provided. This involves possible failure of the power source due to blast damage, and general maintenance problems to assure the availability of electricity when needed.

Accordingly, an object of the present invention is to eliminate the use of electricity in the ventilation of confined spaces.

Another object is to supply a more than adequate supply of fresh air to confined spaces without the employment of machinery.

Another object is to supply more oxygen, in the form of atmospheric air, than would be obtainable by simply expanding and delivering compressed oxygen stored in a cylinder.

A further object is to provide a ventilation system which is simple and economical in construction and and is readily installed.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a ventilation system wherein fresh air from the atmosphere is aspirated by means of a compressed gas capable of sustaining human life, such as compressed air or oxygen or mixtures thereof, and the aspirated mixture of fresh air and gas is delivered to and introduced into the confined spaces.

A preferred embodiment of the invention has been chosen for purposes of illustration and description, and is shown in the accompanying drawing, forming a part of the specification, wherein.

Figure 1:
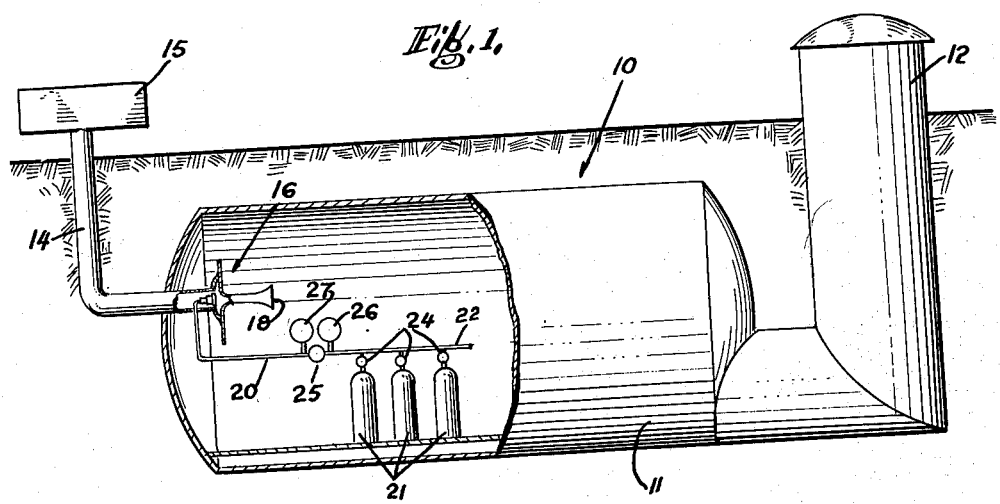
Fig. 1 is a schematic view partly in elevation and partly in section, illustrating a shelter equipped with a ventilation system in accordance with the present invention.

Referring to Fig. 1 of the drawing in detail, a shelter 10 is shown which by way of example may be of the underground type illustrated and described in copending application for Letters Patent of the United States, Serial No. 506,030, filed May 4, 1955 and assigned to the assignee of this application.

As shown herein, the shelter 10 generally comprises a tank 11, providing a confined space, an entrance and exit tube 12, and an air inlet conduit 14 having an open exit tube 12, and an air inlet conduit 14 having an open ing above the ground and extending to the tank for supplying fresh atmospheric air to the confined space. The conduit may be provided with a filter 15, preferably positioned about the conduit opening which serves to filter dust from the air as well as radioactive particles.

In furtherance of the present invention, an aspirator 16 is provided which has an inlet 17 in fluid flow communication with the conduit 14 and has a delivery outlet 18 in communication with the confined space. The aspirator further has an orifice 19 at the inlet 17 (Fig. 2) which is supplied with gas under pressure from a line 20 connected to a suitable source such as a bank of cylinders 21 containing compressed air or oxygen for effecting aspiration of atmospheric air entering the conduit 14. The compressed gas supply line 20 includes a manifold 22, control valves 24 for establishing or shutting off communication between the cylinders and the manifold, a pressure reducing valve 25, and pressure gages 26 and 27 located upstream and downstream of the reducing valve, respectively.

The mixture of air and compressed gas introduced into the confined space is adapted to push out and exhaust stale air through the closure of the tube 12 or through a separate outlet conduit which may extend from the interior of the tank 11 to the atmosphere. In either case, the outlet or exhaust passageway for the stale air enables air to flow therethrough sufficiently freely whereby the pressure within the tank is equivalent to one half inch of water, thus reducing the resistance to introduction of air into the tank to a minimum.

Figure 2:
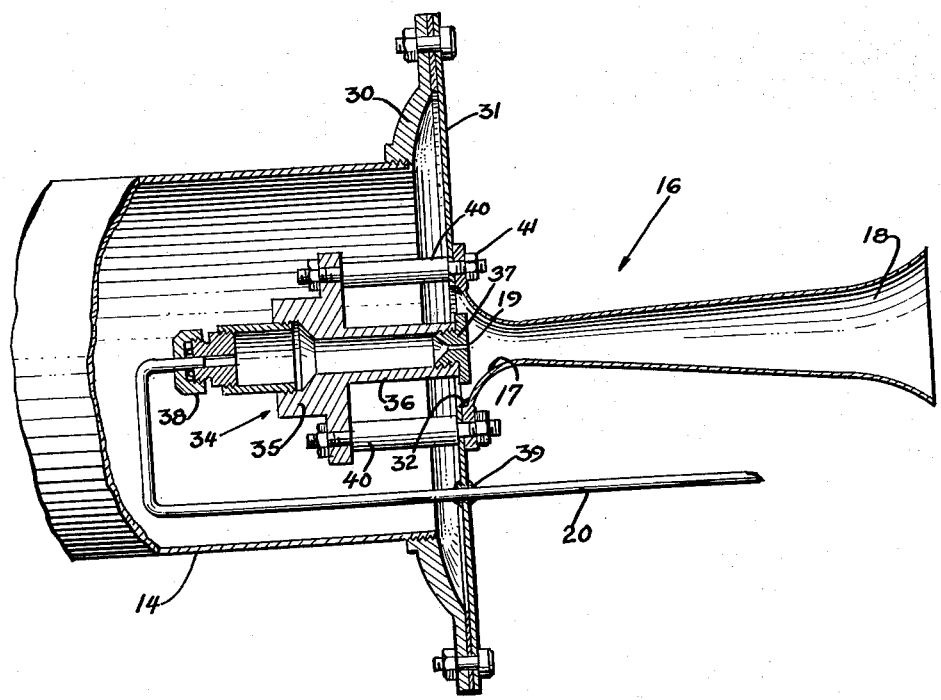
Fig. 2 is an enlarged fragmentary sectional view illustrating the aspirator assembly for the shelter.

A suitable detailed arrangement of the aspirator 16 and the air inlet conduit 14 is shown in Fig. 2. Preferably, the conduit has a relatively large cross-sectional area, such as that of a four inch pipe, to provide for the free flow of air therethrough. A diverging flange 30 is secured to the delivery end of the conduit, and a plate 31 formed with a central aperture 32 is secured to the flange to provide a closure for this end of the conduit. The inlet end 17 of the aspirator is positioned across the aperture 32 and is secured to the plate 31 in the manner about to be described.

The orifice 19 is provided by a nozzle assembly 34 which comprises a flanged fitting 35 having a central nozzle tube 36 facing the aspirator inlet end 17, a bushing 37 secured to the forward end of the tube 36 and having the orifice 19 therein, and an inlet fitting 38 to which the compressed gas supply line 20 is connected. For convenience, the supply line 20 extends through a small hole in the plate 31 and is secured to the plate by a weld or solder spot 39 which also serves to seal the hole.

The nozzle assembly 34 is supported within the delivery end of the conduit 14 with the delivery end of the nozzle orifice 19 positioned slightly within the inlet end 17 of the aspirator to provide for maximum aspiration. This is accomplished by securing one end of circumferentially spaced stud bolts 40 to the flange of the fitting 35 and extending the other end of the bolts 40 through openings in the plate 31 and the flange of the inlet end of the aspirator and securing a nut 41 to the bolts at this end whereby the plate supports the bolts. The aspirator is secured to and is supported by the bolts, and the nozzle assembly in turn is supported by the bolts. Such an arrangement provides for conveniently assembling the elements of the aspirator and attaching them to the conduit.

In the system just described, compressed air or oxygen is expanded through the aspirator to draw in outdoor air through the filter. The aspirator can be designed to move thirty five volumes of atmospheric air against one half inch of water pressure while using one volume of compressed gas at about 400 p.s.i. Although much higher pressures are available from the cylinders, not much is to be gained by utilizing higher motive pressures, and it is convenient to use pressure values on the order of 400 p.s.i. or lower because expansion valves in this range are readily available. At the above rate, five cylinders having a capacity of about one and one half cubic feet each and containing compressed gas having a pressure of about 2200 p.s.i. at 70° F. would provide a total flow of ten cubic feet per minute of aspirated air for seventy two hours. This would be twice the minimum specified by Civilian Defense for five adults. The pressure of one half inch of water is sufficient to draw the air through the type of filter required to remove dust and radioactive particles from the air.

In the event the filter is blocked or damaged, air or oxygen can still be supplied from the cylinders which will meet survival needs even though there may be a decrease in comfort level. In view of such contingency, the use of compressed oxygen is preferred because about five times as many volumes of oxygen are available than in compressed air for the same number of like cylinders. Compressed air can be used in case compressed oxygen is not available provided a greater number of cylinders are installed to provide for a factor of safety.

From the foregoing description, it will be seen that the present invention provides a practical and advantageous system for ventilating confined spaces such as shelters and the like in particular.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A system for ventilating a confined space comprising a conduit having an opening arranged to receive a supply of fresh air and having a delivery end, a flange secured to the delivery end of said conduit, a closure secured to said flange having an aperture therein, an aspirator tube attached to said closure having an inlet of smaller cross-sectional area than said conduit and having an outlet arranged to deliver fresh air into the space, said aspirator tube being in spaced relation from the delivery end of said conduit and connected in fluid flow communication with the aperture in said closure, a nozzle tube positioned in said conduit at said delivery end thereof having an orifice at said aspirator tube inlet and container means attached to said nozzle tube and positioned within said confined space, said container means containing a compressed gas capable of sustaining human life, said compressed gas effecting aspiration of atmospheric air entering said conduit.

References Cited in the file of this patent
UNITED STATES PATENTS

| | | |
|---|---|---|
| 742,618 | Eynon | Oct. 27, 1903 |
| 1,391,217 | Stewart | Sept. 20, 1921 |
| 1,913,347 | Taylor | June 6, 1933 |